United States Patent [19]
Brown

[11] Patent Number: 5,330,111
[45] Date of Patent: Jul. 19, 1994

[54] IMPACT CRUSHER

[75] Inventor: Geoffrey P. Brown, Vancouver, Canada

[73] Assignee: Vitreous Environmental Group Inc., Calgary, Canada

[21] Appl. No.: 815,747

[22] Filed: Jan. 2, 1992

[51] Int. Cl.⁵ .................................. B02C 13/288
[52] U.S. Cl. ............................ 241/56; 241/189.1; 241/194
[58] Field of Search ............ 241/55, 57, 189.1, 194, 241/56

[56] References Cited

U.S. PATENT DOCUMENTS

| | | |
|---|---|---|
| 611,867 | 10/1898 | Pottgens . |
| 813,903 | 2/1906 | Lindhard . |
| 1,013,527 | 1/1912 | Boreo .................. 241/194 X |
| 1,646,720 | 10/1927 | Andrews ................ 241/82 X |
| 1,721,821 | 7/1929 | Knittel .................. 241/196 |
| 2,169,684 | 8/1939 | Erickson ............... 241/194 X |
| 2,573,129 | 10/1951 | Dulart .................. 241/55 X |
| 3,067,958 | 12/1962 | Garwin ................. 241/55 |
| 3,235,189 | 2/1966 | Rogers .................. 241/56 X |
| 3,260,468 | 7/1966 | Beard ................... 241/55 X |
| 3,313,494 | 4/1967 | Peterson ............... 241/56 |
| 3,598,326 | 8/1971 | Pennell et al. . |
| 3,723,372 | 3/1964 | Palyi ................... 241/55 |
| 4,592,514 | 6/1986 | John et al. ............. 241/55 |
| 4,951,882 | 8/1990 | Ober ................... 241/55 |
| 4,960,247 | 10/1990 | Lundell ................ 241/189.1 |

FOREIGN PATENT DOCUMENTS

| | | |
|---|---|---|
| 274506 | 5/1914 | Fed. Rep. of Germany . |
| 1200652 | 9/1965 | Fed. Rep. of Germany . |
| 1086390 | 2/1955 | France . |
| 754659 | 8/1956 | United Kingdom . |

Primary Examiner—Mark Rosenbaum
Assistant Examiner—Frances Han
Attorney, Agent, or Firm—Wegner, Cantor, Mueller & Player

[57] ABSTRACT

Pulverizing apparatus, known as hammer mills, for crushing rocks, etcetera, are known, which use swinging hammers, pivotally mounted on a rotating axis within a casing. The present invention provides a crushing apparatus comprising a housing with first and second cylindrical chambers, the first chamber having an inlet for input of material to be crushed, and the second chamber having an outlet for expulsion of crushed material. An axle is mounted for rotation in the housing and provided with means for rotating the axle. Hammers are mounted for rotation in the first chamber. Blades are mounted for rotation in the second chamber and have a flat surface for moving air in the second chamber. A flywheel is mounted for rotation on the rotating axle and forms a central wall between the first and second chamber while being adapted to leave a clearance between the first and second chamber sufficient for movement of crushed particles.

6 Claims, 4 Drawing Sheets

IMPACT CRUSHER

TECHNICAL FIELD

The invention relates to pulverizers of the type which use rotating hammers.

BACKGROUND ART

Pulverizing apparatus, known as hammer mills, for crushing rocks, etcetera, are known, which use swinging hammers, pivotally mounted on a rotating axis within a casing. See, for example, U.S. Pat. No. 1,646,720. Typically, one or more hammers rotate rapidly about a central shaft. The rapidly rotating hammers strike and crush the rocks. The rocks are then screened to ensure crushing to the appropriate size. See also, U.S. Pat. Nos. 1,013,527; 1,721,821 and 2,169,684. These existing hammer mill rock pulverizers tend to jam frequently, particularly if traces of moisture are present, and are not useful for producing a continuous supply of pulverized rock of the proper consistency.

Current environmental concerns dictate that glass bottles be recycled rather than disposed of in land fills. For a number of reasons, including cost, it is preferable in many situations to crush the glass bottles into a fine sand, and use such sand for other purposes such as covering land fill. Such sand should be of uniform particle size to avoid hazards. Hence there is a need for a pulverizing apparatus which is well suited for crushing glass into a uniform sand.

SUMMARY OF THE INVENTION

The present invention therefore provides a crushing apparatus comprising a housing comprising first and second cylindrical chambers, the first chamber having an inlet for input of material to be crushed, and the second chamber having an outlet for expulsion of crushed material. An axle is mounted for rotation in the housing and provided with means for rotating the axle. Hammers are mounted for rotation in the first chamber. Blades are mounted for rotation in the second chamber and have an extended surface adapted for moving air in the second chamber. A flywheel is mounted for rotation on the rotating axle and forms a central wall between the first and second chamber while being adapted to leave a clearance between the first and second chamber sufficient for movement of crushed particles.

BEST MODE(S) FOR CARRYING OUT THE INVENTION

Figure 1:
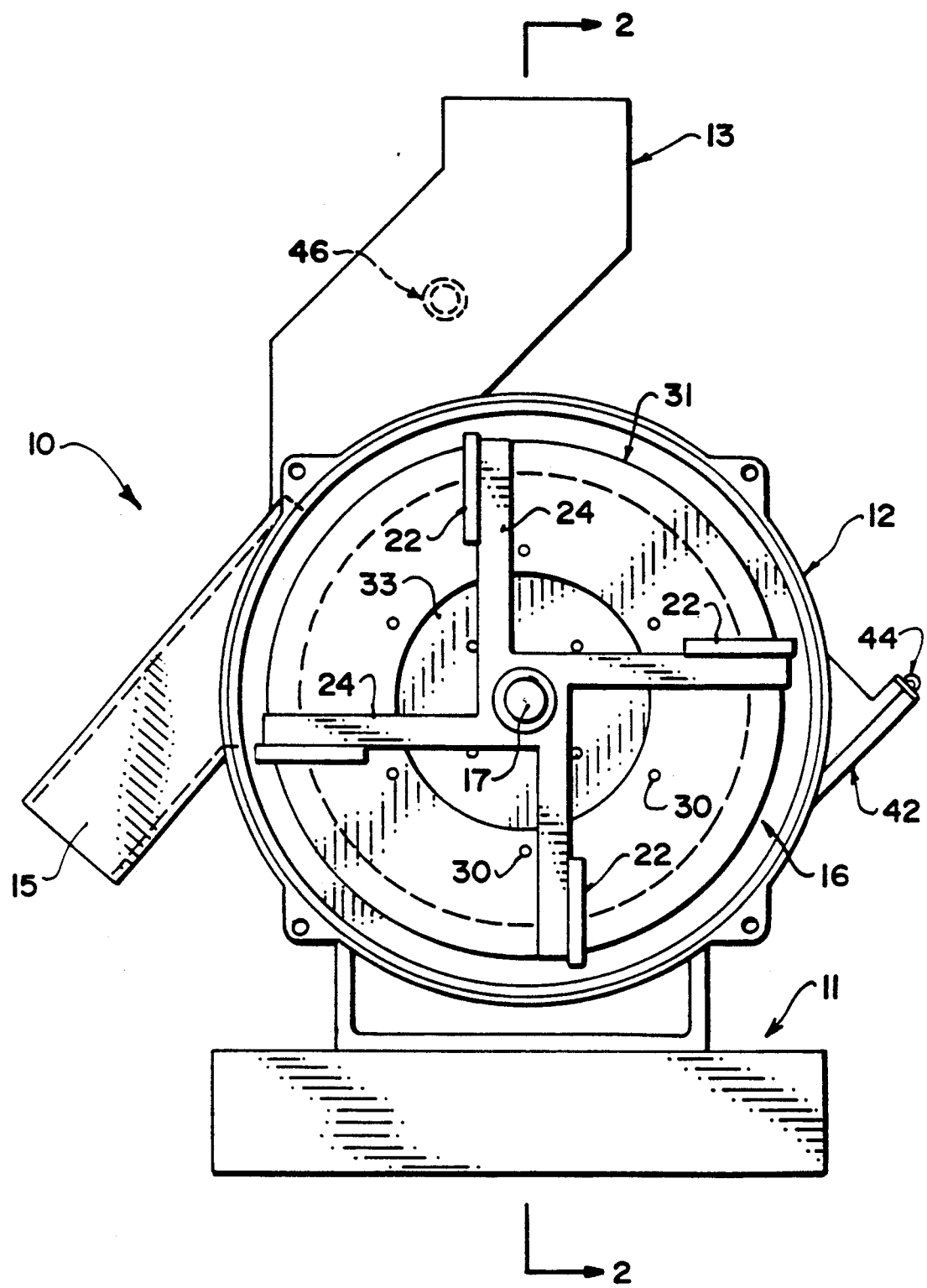
FIG. 1 is a front view of the invention, with the interior details shown.

With reference to the drawings, the apparatus of the invention is designated generally as 10. It has a casing 12, provided with an inlet chute 13, into which glass bottles are fed and an outlet chute 15 from which the crushed glass is expelled from the machine. Casing 12 is secured to base 11 and has two hollow cylindrical compartments 14 and 16. Power-driven shaft 17 extends through the central axis of both compartments. Suitable power supply means (not shown) is provided to rotate shaft 17. A number of "hammers" 8 are mounted on shaft 17 for rotation in compartment 14. Hammers 8 are pivotally mounted at the end of arms 20, on axles 21. The ends of axles 21 are fixed in flanges 29 of hammer support rotor 27 on shaft 17. The hammer is typically constructed of a heavy, wear-resistant metal such as iron, and faced with a wear resistant material such as carbide.

Figure 2:
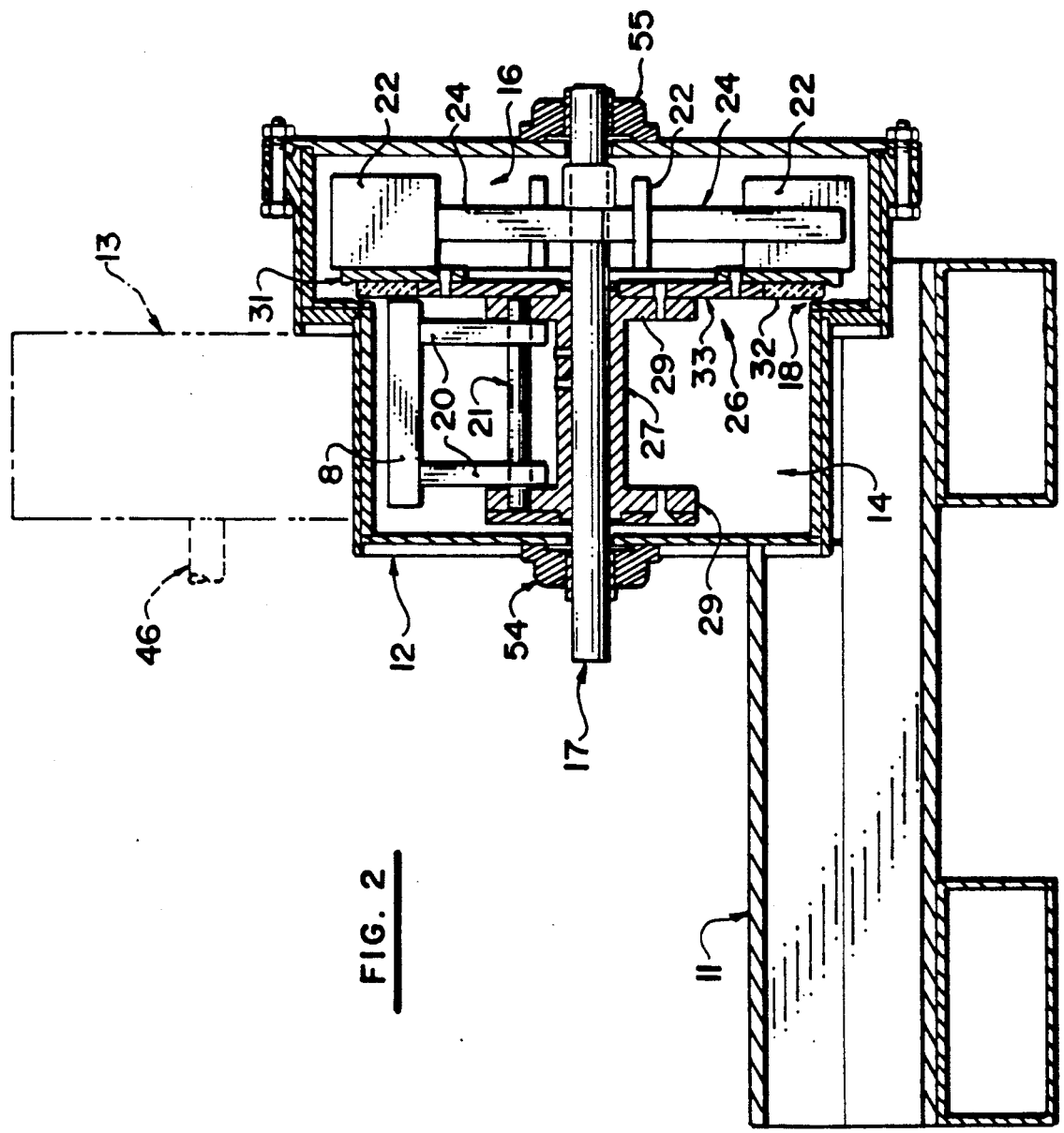
FIG. 2 is a cross-sectional view taken through lines 2—2 of FIG. 1.
Figure 3:
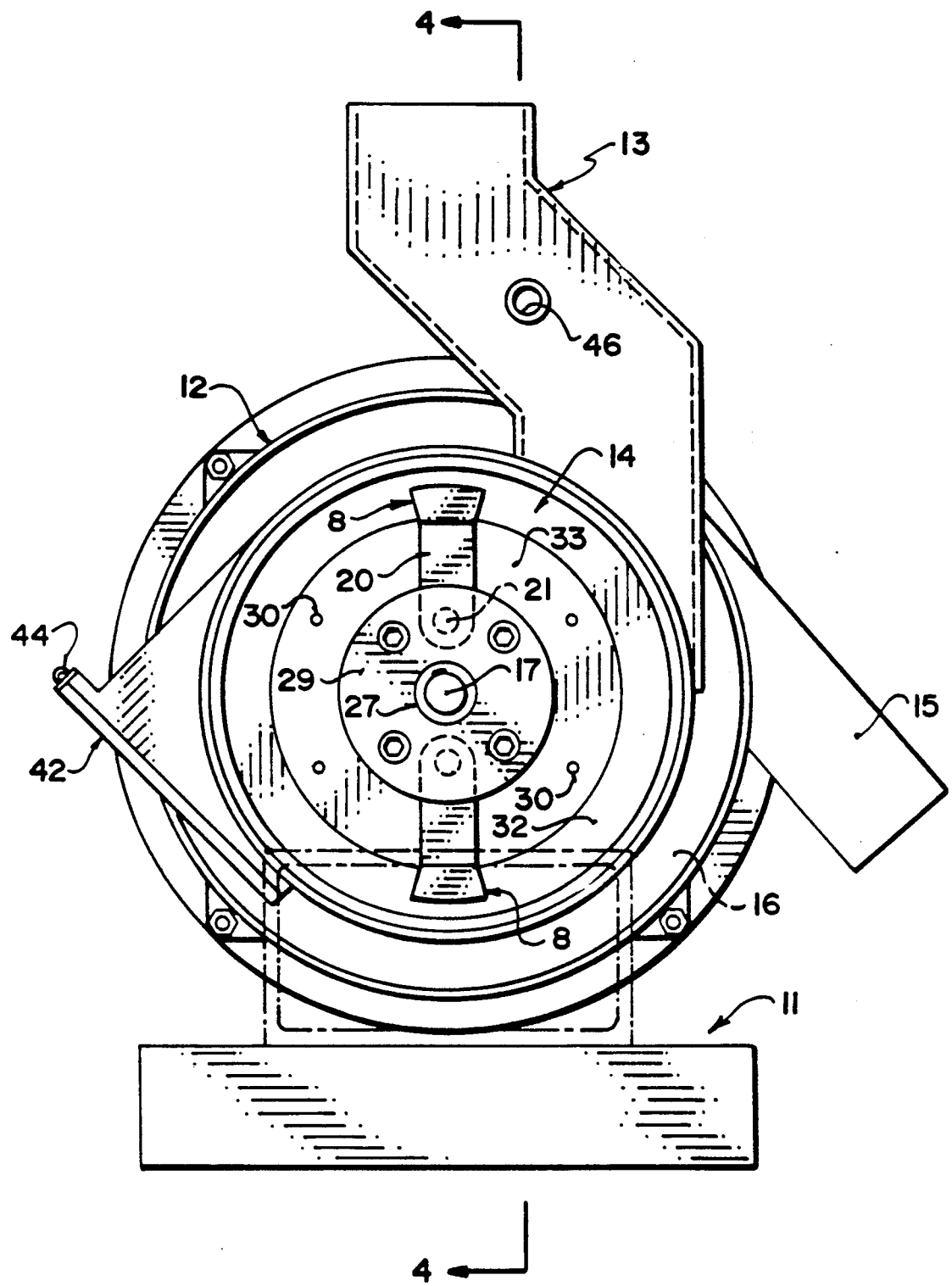
FIG. 3 is a rear view of the invention, with the interior details shown.
Figure 4:
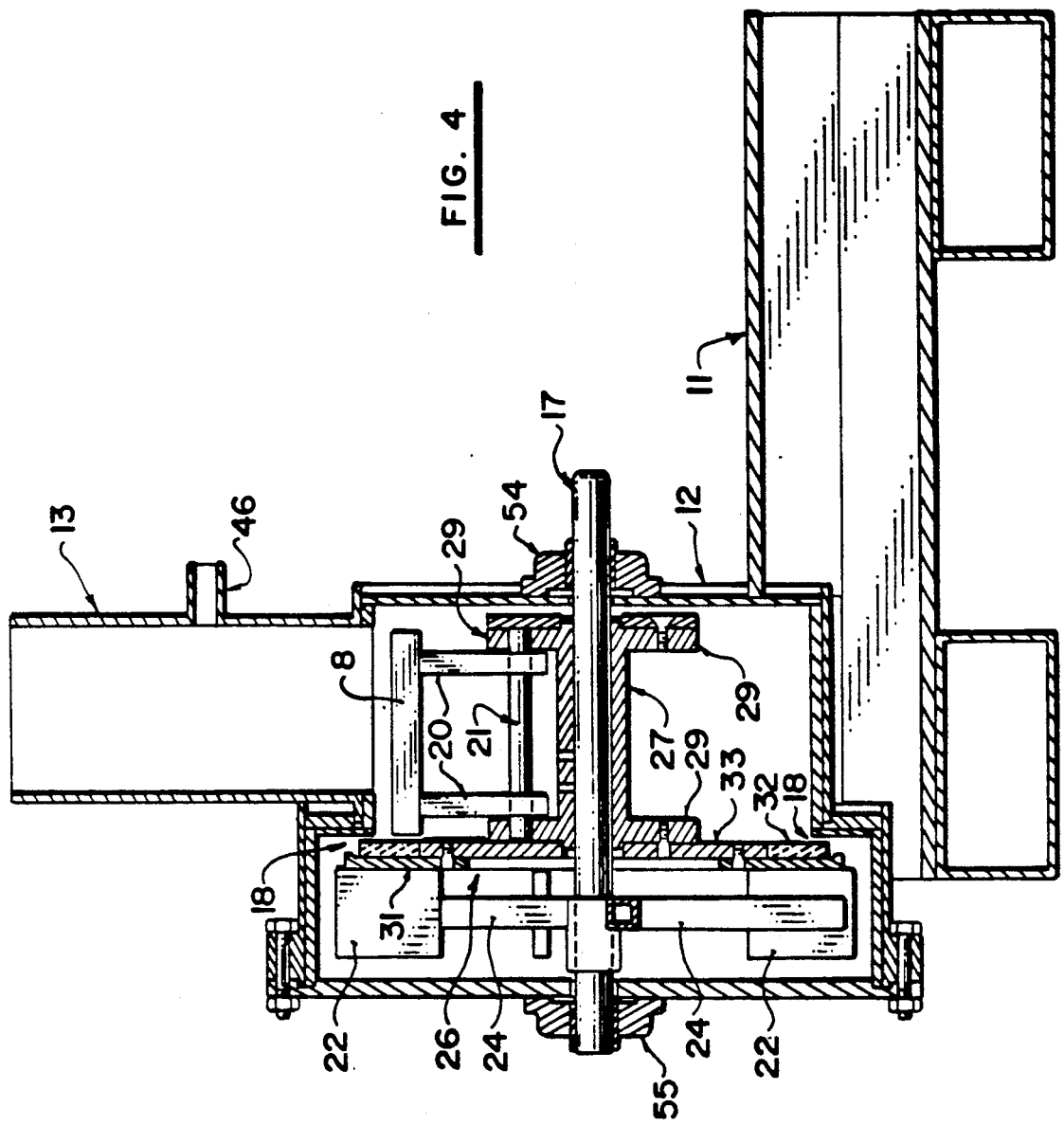
FIG. 4 is a cross-sectional view taken through lines 4—4 of FIG. 3.

In chamber 16, flat metal plates 22 are mounted on the ends of arms 24 which similarly rotate on shaft 17. Plates 22 are fixed rigidly at the ends of arms 24 to act as fans, and are also of metal and are carbide faced, but are lighter and thinner than hammers 8. The radius of the circle circumscribed by the end of plates 22 is greater than that of hammers 8. Blades 22 are angled slightly forwardly in the direction of motion and thus provide a surface at an angle slightly less than perpendicular to the direction of angular motion of arms 24. Typically, there will be at least two hammers 8 (only one is shown in FIG. 2 and 4), and possibly a greater number, and four blades 22.

Also mounted on shaft 17 between chambers 14 and 16, is a circular flywheel 26 consisting of a holding plate 33, outer wear ring 31 and ceramic annulus 32. Flywheel 26 is larger in diameter than hammer 8 and is mounted on hammer support rotor 27 and completely separates chambers 14 and 16 except for a small clearance gap 18 between the inside face of the circular flywheel 26 and casing 12. Such inside face is also finished with a wear resistant material such as ceramic or carbide. By moving the flywheel 26 in a horizontal direction, the dimension of gap 18 can be altered, thereby adjusting the particulate size that will pass through the gap. Bolts at 30 connect an outer wear ring 31 to the holding plate 33. Flywheel 26 is constructed of a heavy metal to provide it with considerable angular momentum when rotated. An outer annulus 32 of the flywheel is preferably a ring made of a hard ceramic to improve the wear characteristics of the device. An access hatch 42 is hinged at 44 to permit access to the primary chamber for removal of unwanted objects etc. A water coupling 46 is also provided to permit introduction of water for dust control purposes.

In operation, bottles to be crushed are inserted into inlet 13 and are crushed by rotating hammers 18. Plates 22 act as fans, forcing air out inlet 15 and creating a low pressure in chamber 16, sucking air and fine particles through gap 18 into chamber 16. Blades 22 further reduce the size of the particles which are thereby sucked into chamber 16 and drive the particles out through outlet 15. Flywheel 26 also acts as an energy storing device to maintain a constant crushing action. A screen (not shown) may also be provided across outlet 15 to ensure that the particles have been crushed to the appropriate size.

Blades 22 may be slightly raked towards the flywheel across the face to increase the output of the device by grading the material towards the flywheel gap. Also, chamber 16 may be off center to allow blades 22 to come close to the upper walls of chamber 16 while allowing particles to collect on the screen across the outlet.

As will be apparent to those skilled in the art in the light of the foregoing disclosure, many alterations and modifications are possible in the practice of this invention without departing from the spirit or scope thereof.

Accordingly, the scope of the invention is to be construed in accordance with the substance defined by the following claims.

I claim:

1. A crushing apparatus comprising:
   (a) a housing comprising first and second cylindrical chambers, said first chamber having a first diameter and an inlet for input of material to be crushed and air, and said second chamber having an outlet for expulsion of air and crushed material, said housing defining an opening between said first chamber and said second chamber, the opening having a diameter substantially equal to the first diameter of the first chamber;
   (b) an axle mounted for rotation in said housing and provided with means for rotating said axle;
   (c) a hammer mounted on said axle for rotation in said first chamber;
   (d) a blade mounted for rotation on said axle in said second chamber and having an extended planar surface oriented for moving air in said second chamber and out of said outlet;
   (e) a flywheel mounted on said rotating axle for rotation with said rotating axle and forming a central wall between said first and second chamber spaced from the housing to permit a selected flow of air and crushed particles around the periphery of the flywheel from said first chamber to said second chamber.

2. The apparatus of claim 1 wherein said hammer is pivotally mounted on the end of an arm which in turn is pivotally mounted on said rotating axle.

3. The apparatus of claim 1 wherein said second chamber is larger in diameter than said first chamber by a predetermined amount, thereby controlling the velocity of expelled air and crushed particles from said second chamber.

4. The apparatus of claim 1 comprising two of said hammers mounted at diametrically opposed locations on said axle.

5. The apparatus of claim 1 comprising a plurality of said blades mounted at equidistant locations on said axle.

6. The apparatus of claim 1, wherein said second chamber is larger in diameter than first chamber, said housing has a radial wall extending in a substantially radial direction with respect to said axle at the boundary of said first and second chambers, the space between the flywheel and the housing is defined at least in part by said radial wall and a surface on the flywheel which faces the radial wall, and the location of the flywheel is adjustable along its axis of rotation, the adjustment of the flywheel along its axis of rotation permitting adjustment of the space between the flywheel and the housing.

* * * * *